(12) United States Patent
Ugolini et al.

(10) Patent No.: US 7,391,952 B1
(45) Date of Patent: Jun. 24, 2008

(54) PRE-CONNECTORIZED FIBER OPTIC CABLE NETWORK INTERCONNECTION APPARATUS

(75) Inventors: Alan W. Ugolini, Hickory, NC (US); Ray S. Barnes, Hickory, NC (US); Robert W. Dennis, Hickory, NC (US); Elmer Mariano Juarez, Tamaulipas (MX); Manuel Alejandro Lopez Sanchez, Tamaulipas (MX)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/513,942

(22) Filed: Aug. 31, 2006

(51) Int. Cl.
*G02B 6/00* (2006.01)
(52) U.S. Cl. .................................. 385/135; 385/134
(58) Field of Classification Search .......... 385/134–137
See application file for complete search history.

(56) References Cited

U.S. PATENT DOCUMENTS

| | | | | |
|---|---|---|---|---|
| 4,911,662 | A | * | 3/1990 | Debortoli et al. ............ 439/719 |
| 5,231,687 | A | * | 7/1993 | Handley ...................... 385/139 |
| 5,260,957 | A | | 11/1993 | Hakimi et al. ................ 372/39 |
| 5,881,200 | A | | 3/1999 | Burt ............................ 385/142 |
| 5,887,106 | A | * | 3/1999 | Cheeseman et al. ......... 385/135 |
| 6,577,801 | B2 | | 6/2003 | Broderick et al. ........... 385/125 |
| 6,710,366 | B1 | | 3/2004 | Lee et al. ..................... 257/14 |
| 6,968,107 | B2 | | 11/2005 | Belardi et al. ............... 385/127 |
| 7,054,513 | B2 | | 5/2006 | Herz et al. ................... 385/12 |
| 2002/0117571 | A1 | * | 8/2002 | Scott et al. .................. 242/388 |
| 2005/0111809 | A1 | * | 5/2005 | Giraud et al. ............... 385/135 |

OTHER PUBLICATIONS

International Telecommunication Union, ITU-T G.652, Telecommunication Standardization Sector of ITU, Jun. 2005, Series G: Transmission Systems and Media, Digital Systems and Networks, Transmission media characteristics—Optical fibre cables, Characteristics of a single-mode optical fibre and cable, ITU-T Recommendation G.652, 22 pgs.

International Telecommunication Union, ITU-T G.657, Telecommunication Standardization Sector of ITU, Dec. 2006, Series G: Transmission Systems and Media, Digital Systems and Networks, Transmission media and optical systems characteristics—Optical Fibre Cables, Characteristics of a bending loss insensitive single mode optical fibre and cable for the access network, ITU-T Recommendation G.657, 20 pgs.

(Continued)

*Primary Examiner*—Hemang Sanghavi

(57) ABSTRACT

A pre-connectorized network interconnection apparatus including a housing defining at least one opening for mounting at least one adapter therein, a cable storage tray movably attached to the housing movable between an opened position and a closed position for cable access, and a predetermined length of pre-connectorized fiber optic cable maintained on the storage tray, wherein a first end of the fiber optic cable terminates in at least one connector routed to the at least one connector adapter within the apparatus and a second end of the fiber optic cable terminates in at least one connector that is routed to a predetermined location within a fiber optic network. A data center network apparatus for linking separated fiber optic connection points using a length of pre-connectorized fiber optic cable.

25 Claims, 7 Drawing Sheets

OTHER PUBLICATIONS

Gibson et al., Evanescent Field Analysis of Air-Silica Microstructure Waveguides, IEEE, 0-7803-7105-Apr. 1, 2001, pp. 709-710.

Monro et al., "Holey Fibers with random cladding distributions" Optic Letters, vol. 25, No. 4; Feb. 15, 2000.

Pickrell et al., "Novel Techniques for the Fabrication of Holey Optical Fibers" Spie Conference Proceedings, vol. 4578, pp.271-282; 2001.

* cited by examiner

PRE-CONNECTORIZED FIBER OPTIC CABLE NETWORK INTERCONNECTION APPARATUS

BACKGROUND OF THE INVENTION

1. Field of the Invention

The present invention relates generally to an apparatus for storing and maintaining fiber optic cable and providing a link for future deployment within a data center or other optical network environment, and more specifically, to a fiber optic network interconnection apparatus that allows a technician to coil and uncoil a desired length of pre-connectorized fiber optic cable for future or re-installation from the rear side of an installed apparatus.

2. Technical Background of the Invention

Fiber optic networks are being developed to deliver voice, video, and data transmissions to subscribers over both private and public networks. These fiber optic networks often include separated connection points at which it is necessary to link optical fibers in order to provide "live fiber" from one connection point to another connection point. Often times, these separated connection points are found within different distribution frames within a data center or central office. Distribution frames are typically used to mount connector housings, terminal blocks and/or main frame connectors, and fiber optic adapter access and cable management is often complex and difficult due to the number of connectors populating a distribution frame.

In order to facilitate module linking and interconnections, what is needed is a network apparatus capable of being installed within conventional and hereafter devised connection terminals, such as connector housings, examples of which are found in the Pretium™ Connector Housing family available from Corning Cable Systems of Hickory, N.C. The apparatus should be capable of linking separated connection points and provide protection and maintenance of the fiber optic cable within when not deployed and when installed. It would be desirable for the fiber optic cable within the apparatus to be accessed from the rear side without having to uninstall the apparatus. What is further desired is a complete pre-connectorized package including a mountable housing, at least one adapter, securing features that do not require the use of tools, cable management features, and a fiber optic cable including at least one, and preferably a plurality of, single fiber connectors on one end of the cable routed to the at least one adapter and a multi-fiber connector on the other end of the cable for routing to a predetermined location within the network. The packaged data center would provide easy open access to connectors for moves, additions and changes and for connector cleaning.

SUMMARY OF THE INVENTION

In one embodiment, the present invention provides a packaged data center apparatus for linking separated connection points in order to provide "live fiber" from one connection point to another connection point. The data center apparatus includes a housing, at least one adapter mounted within the housing, a pre-connectorized fiber optic cable and structure for maintaining the fiber optic cable. In one embodiment, the cable is terminated on one end in a plurality of single fiber connectors that are routed to the rear side of the at least one adapter from within the housing, and the other end of the cable terminates in a multi-fiber connector that is routed to a predetermined location within the network. The cable has a predetermined length that is stored within the apparatus and may be manually coiled and uncoiled in order to provide an adequate length for routing the multi-fiber connector to the predetermined location.

In another embodiment, the present invention provides a pre-connectorized interconnection apparatus for mounting within a distribution frame or connector housing. The apparatus includes a housing defining a first portion for fiber optic cable storage and a second portion for fiber optic cable routing to at least one adapter. The first and second portions may be separated by a transition lid, also referred to herein as a "false bottom." The transition lid may define an opening for transitioning the fiber optic cable from the first portion to the second portion. The length of fiber optic cable is stored and maintained by storage structure affixed to a tray, also referred to herein as the "lid." The storage tray is slidably and pivotally attached to the apparatus housing. A front portion of the housing includes at least one slot for mounting at least one adapter. In one embodiment, the front portion defines at least one row or column of slots for mounting a plurality of adapters. The front portion may further define mounting fasteners, such as plungers and grommets, for readily and removably mounting the apparatus within a distribution frame, connector housing or other mounting structure. The rear portion of the apparatus defined by the tray includes a port for allowing the fiber optic cable to pass through, a lock mechanism for preventing the tray from being extended when a strong pull in the cable occurs, and an optional handle for pulling out the tray to access the fiber optic cable length. The apparatus may further include a self-locking latch.

In yet another embodiment, the present invention provides a data center module including at least one LC duplex and/or SC duplex adapter positioned about the front of the module and an MTP connector positioned about the rear of the module. The fiber optic cable within the module is strain relieved to prevent damage caused by exceeding the minimum bend radius in the situation of a strong pull on the cable. A flexible boot is provided about the rear of the module and is retained within a recess defined by the module. The flexible boot may provide strain relief of the cable when inserted into the recess and also prevents kinking or sharp bending in the cable adjacent the module. The module may include any type and length of fiber optic cable capable of providing a link between modules. The fiber optic cable may include any now known of hereinafter devised type of optical fiber including single mode, multimode and bend insensitive types of optical fibers. Fiber optic cable length is accessed by opening the module to access the storage tray. The storage tray may be slid and rotated to a predetermined angle once opened to facilitate cable access. The cable may be manually coiled or un-coiled and deployed as needed. Module sizes may include single wide and double wide versions, among others. Module may be designed to be either left-opened or right-opened in order to have the fiber optic cable exit at the top or bottom of the module. In preferred embodiments, the module requires no tools for access and operation.

Additional features and advantages of the present invention will be set forth in the detailed description which follows, explaining the principles and operations thereof, and will also be readily apparent to those of ordinary skill in the art from the description and/or recognized by practicing the invention as described. It is to be understood that the general description above and the detailed description which follows present exemplary embodiments of the invention, which are intended to provide an overview and framework for understanding the nature and character of the invention as it is claimed. The accompanying drawings are incorporated into and constitute a part of this specification, illustrating and further highlighting the exemplary embodiments of the present invention.

DETAILED DESCRIPTION OF THE PREFERRED EMBODIMENTS

Reference will now be made in detail to the preferred embodiments of the present invention, examples of which are illustrated in the accompanying drawings. Whenever possible, like reference numbers will be used to refer to like components or parts. Although specific data center network apparatus are shown and include duplex SC or LC connector adapters, it is envisioned that other apparatus configurations including any adapter, connector or cable type may be incorporated without departing from the spirit and scope of the present invention. Although the present invention is primarily described for use in a data center, the present invention may be deployed in any network environment in which is it desired to provide a pre-connectorized fiber optic link or interconnection point. The data center apparatus may be a stand-alone unit or may be mounted within a connector housing distribution frame of other structure.

Figure 1:
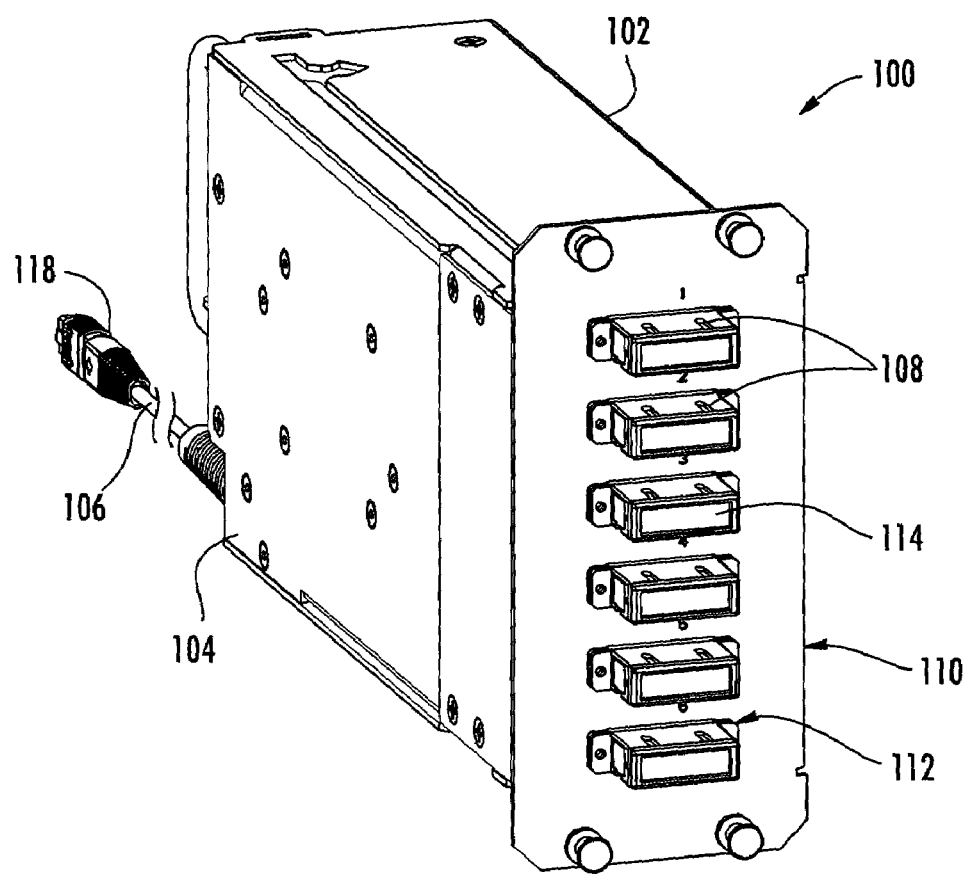
FIG. 1 is a front perspective view of a pre-connectorized data center network apparatus illustrating at least one adapter.

Referring to FIGS. 1-8, the data center apparatus 100, also referred to herein as the "interconnection apparatus", "connection apparatus", "module" or "apparatus", of the present invention includes a housing 102, a fiber optic cable storage tray 104 slidably and pivotally attached to the housing 102, a length of pre-connectorized fiber optic cable 106 and at least one connector adapter 108. Referring specifically to FIG. 1, a front end 110 of the apparatus 100 defines one or more slots 112 arranged in any number of rows or columns operable for receiving and securing the at least one adapter 108 within. As shown, the apparatus 110 includes a single row of slots 112 with each slot receiving a single SC duplex adapter 108 for a total of six adapters 108 providing connection points for twelve SC connectors. As stated above, the apparatus 100 may include any number of connector adapter or connector receiving sites capable of accommodating any type and number of connectors. As shown, the adapters 108 include removable covers 114 for protecting unpopulated adapters until needed. The front end 110 further includes attachment features 116 for removably securing the apparatus 100 to or within a distribution frame, connector housing or other mounting structure. As shown, the attachment features include a plunger and grommet configuration that allows for the apparatus 100 to be installed or removed without the use of tools. The housing 102 and cable storage tray 104 together define a cable storage cavity for storing a length of pre-connectorized fiber optic cable 106 that may be manually coiled or un-coiled as needed and routed to a predetermined location within the network.

Still referring to FIG. 1, the fiber optic cable 106 is shown terminating at one end in a multi-fiber connector 118. Although an MTP connector is shown, it is envisioned that the fiber optic cable 106 may terminate in any type of single fiber or multi-fiber connector, but preferably terminates in a multi-fiber connector. Although not shown, the other end of the fiber optic cable terminates in at least one connector, and preferably a plurality of single fiber connectors such as SC or LC connectors. The fiber optic cable 106 is routed within the apparatus 102 through a transition lid (described in detail below) where the at least one, and preferably a plurality of, connectors are routed to the backside of the at least adapter 108. Thus, the network apparatus 100 is capable of receiving at least one connector from the inside of the apparatus 100 from the fiber optic cable 106, and at least one connector from another source from the outside of the apparatus 100. The mating connectors may be of like configuration or may be different. Thus, the at least one adapter 108 may be a standard adapter or a hybrid adapter. Although not shown, each at least one adapter 108 may include a connector alignment sleeve. The fiber optic cable 106 has a predetermined length and is stored within the apparatus 100 and is coiled and uncoiled in order to provide an adequate length for routing the multi-fiber connector 118 to the predetermined location.

Figure 2:
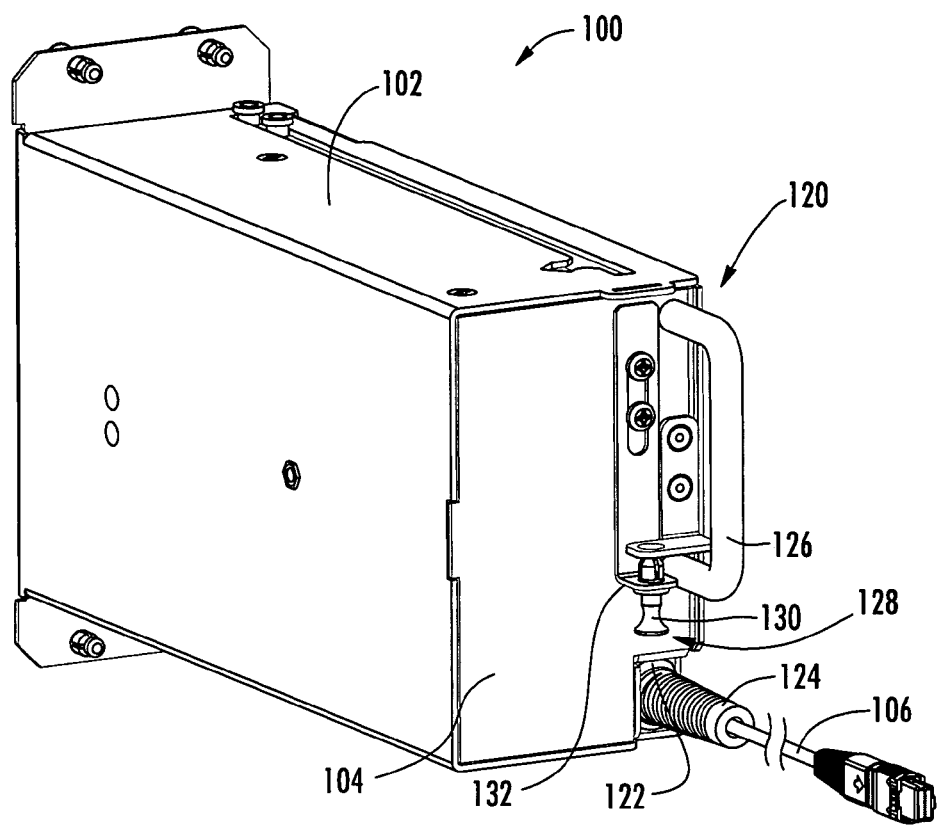
FIG. 2 is a rear perspective view of the apparatus of FIG. 1 illustrating a pre-connectorized fiber optic cable, cable exit point, pull handle and locking mechanism.

Referring to FIG. 2, a rear perspective view of the network apparatus 100 is shown. The rear side 120 of the apparatus 100, and specifically the storage tray 104, includes a pre-connectorized fiber optic cable exit point 122, a transition boot 124 positioned within the exit point 122 for transitioning the fiber optic cable from within to outside of the apparatus 100, a pull handle 126 for pulling out and pushing in the storage tray 104 as needed, and a tray locking mechanism 128. The handle 126 may be replaced with any feature capable of being grasped to operate the storage tray 104. The locking mechanism 128 is operable for preventing the storage tray 104 from being unintentionally opened when a strong pull on the fiber optic cable 106 occurs. The lock mechanism 128 shown includes a plunger 130 and bracket 132. In order to disengage the storage tray 104 from the housing 102, the plunger 130 is pulled up and the bracket 132 lifted, the tray 104 is then opened. To lock the tray 104 in place, the tray 104 is closed, the bracket 132 is pushed down against a bracket receiving tab, and the plunger 130 is pushed down to secure the bracket 132 against the tab of the housing 102.

Figure 3:
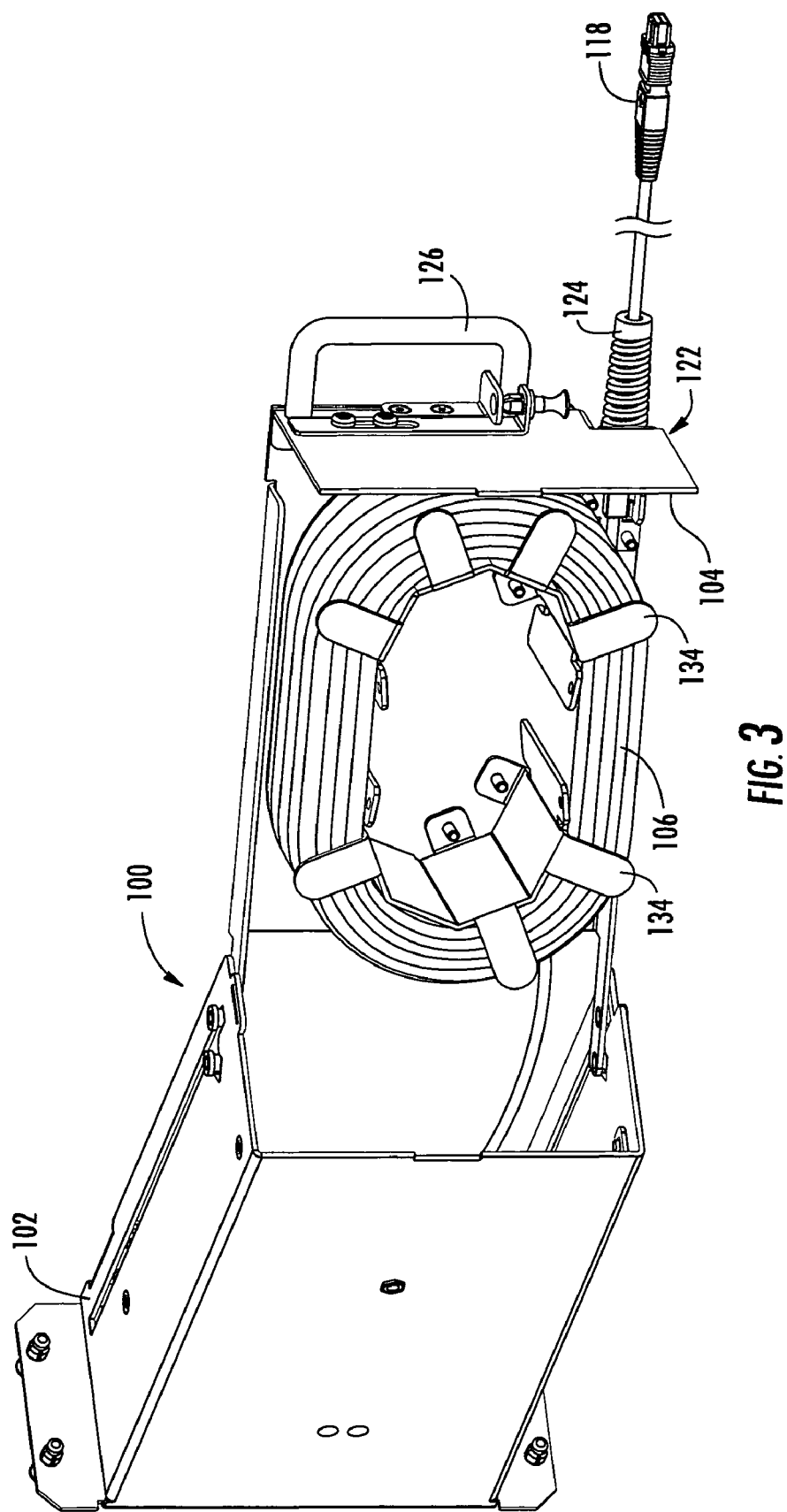
FIG. 3 is a perspective view of the apparatus of FIG. 1 shown with the storage tray in an opened and pivoted position.

Referring to FIG. 3, the storage tray 104 is shown in an opened and pivoted configuration. The storage tray 104 includes at least one fiber optic cable maintaining and retaining feature 134. The at least one feature 134 is operable for maintaining the cable 106 in a coiled configuration without violating the minimum band radius of the fiber. The length of coiled fiber optic cable may be of any length. Apparatus 100 width may be determined by the amount of slack contained within. The fiber optic cable length is wound around the at least one feature 134 during shipping and deployment and uncoiled as needed. Fiber optic cable length may range from about 1 foot to several hundred feet in length, preferably from about 1 to about 100 feet in length. The fiber optic cable 106 may be coiled in either direction and is preferably coiled so that each end of the cable is smoothly routed to its respective predetermined destinations within the apparatus 100 without introducing sharp bends in the cable 106. The cable 106 may further be coiled with a length of slack free from the coil to allow the storage tray 104 to be extended without pulling on the cable 106. In operation, and as will be described in more detail below, the cable 106 exits the apparatus 100 through the exit point 122. The cable 106 is fed through the cable transition boot 124. The transition boot 124 is retained within the exit point 122. The flexible transition boot 124 prevents kinking or sharp bending in the cable adjacent the storage tray 104. As cable length is uncoiled, the cable is pulled and slides through the transition boot 124. In an alternative embodiment, the transition boot 124 may provide partial strain relief to the cable 106 when the boot 124 is inserted into the exit point 122 and the exit point recess compresses the boot 124. In one embodiment, the transition boot 124 may include ridges on the interior surface such that when the boot is squeezed when slid into the storage tray slot, strain relief and partial or total sealing may occur. The apparatus 100 may be designed to be either left- or right-opened and the exiting cable 106 may be located at either the top of the bottom of the apparatus 100.

Figure 4:
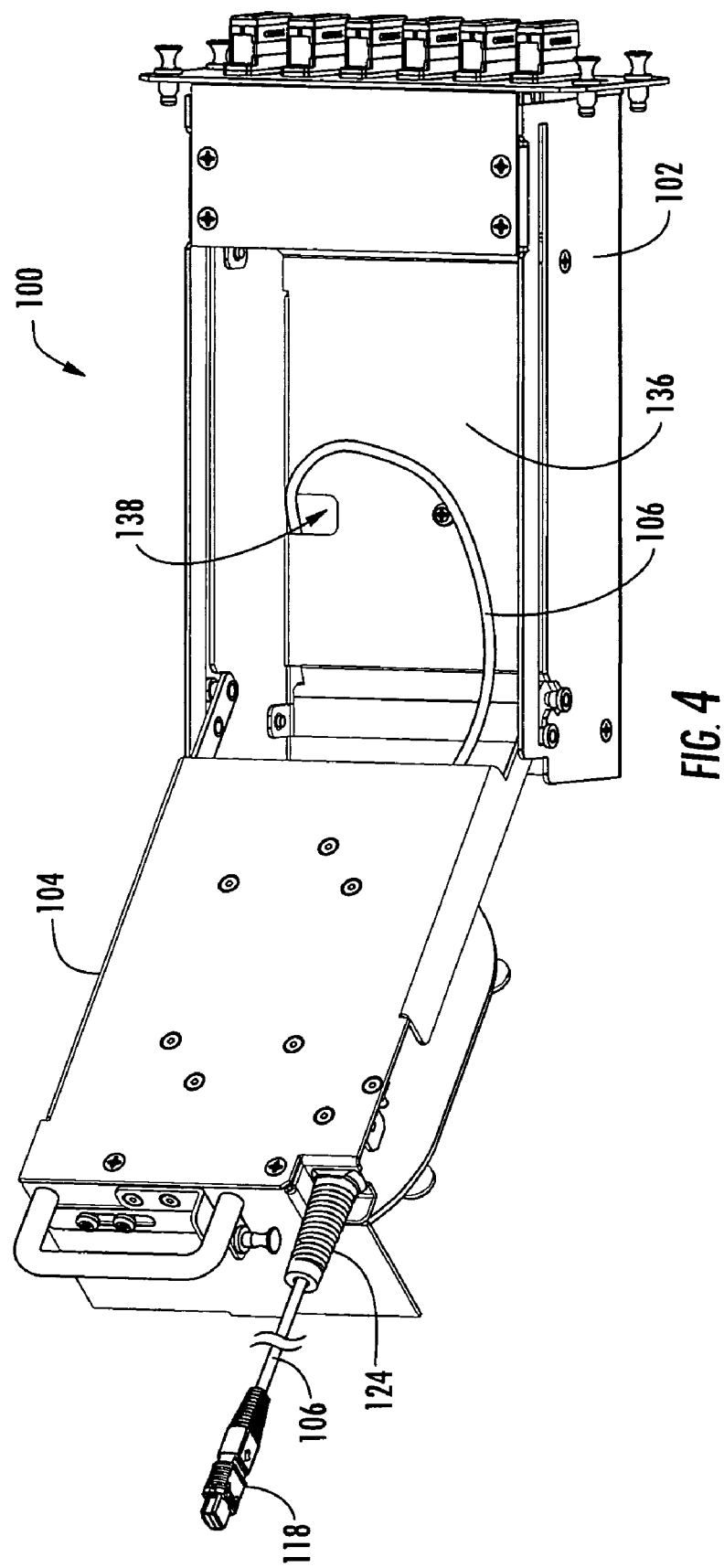
FIG. 4 is a perspective view of the apparatus of FIG. 3 shown with the storage tray in an opened and pivoted position and illustrating the transition lid.

Referring to FIG. 4, the storage tray 104 is shown in an opened and pivoted configuration in order to illustrate the internal cavity of the apparatus 100 and the transition lid 136. The apparatus 100 defines a first internal cavity portion for fiber optic cable storage and a second portion for fiber optic cable routing to the at least one adapter. The first and second portions are separated by the transition lid 136, also referred to herein as the "false bottom." The transition lid 136 may define an opening 138 for transitioning the fiber optic cable 106 from the first portion to the second portion. The transition lid 136 may further provide protection to the pigtailed end of the cable 106 when the apparatus 100 is accessed to coil or uncoil the fiber optic cable 106. In the example shown, the transition lid 136 hides/covers the routing of the 12 fibers to their respective adapters. In an alternative embodiment, a single fiber connector may be mounted in place of the multi-fiber connector, and a splitter or other signal splitting device may be mounted within the apparatus, for example within the second portion, thus allowing multiple fibers to be routed to the adapters.

Figure 5:
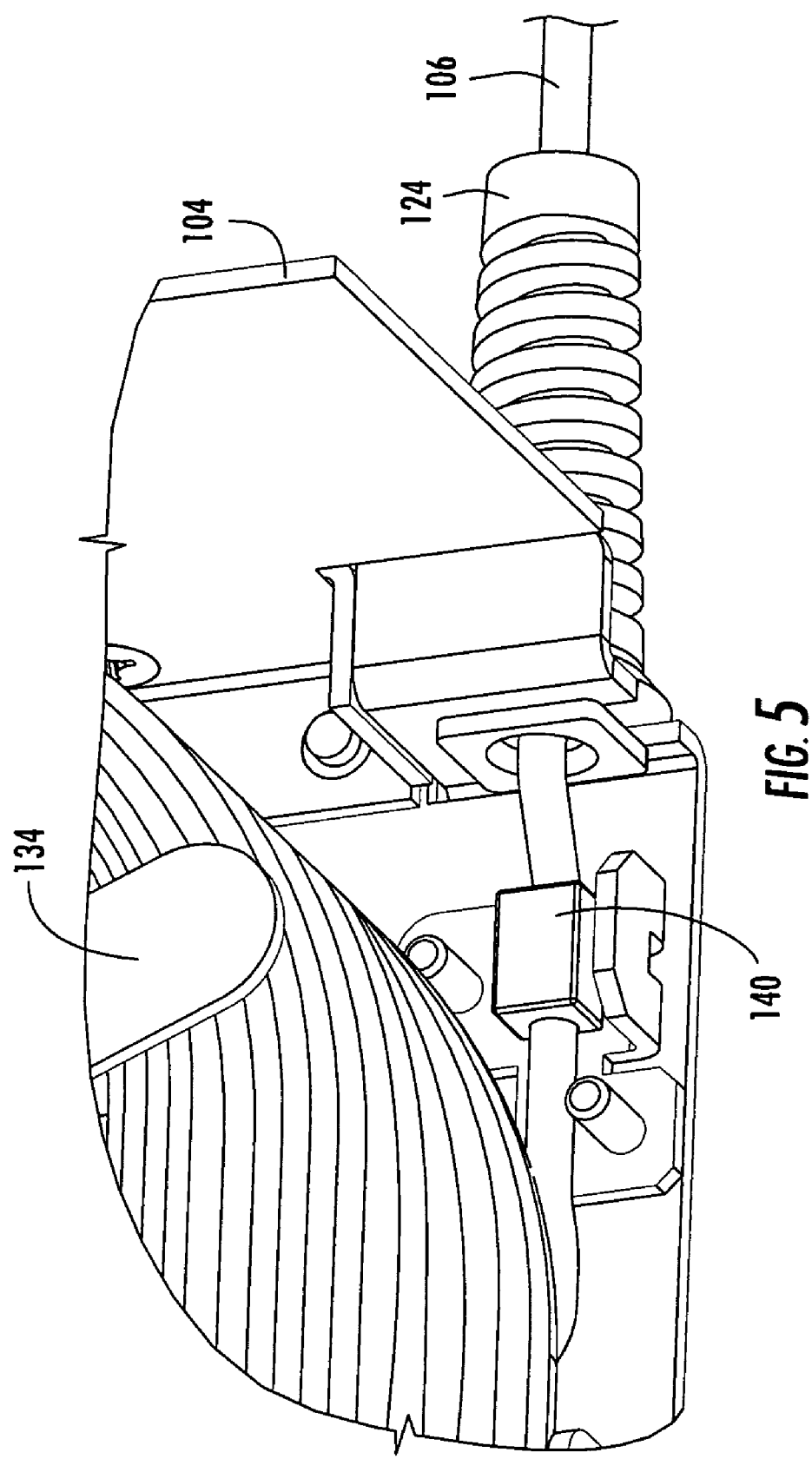
FIG. 5 is a detailed perspective view of the apparatus of FIG. 1 illustrating the strain relief feature and flexible boot for fiber optic cable exiting.

Referring to FIG. 5, cable strain relief and the transition boot 124 are shown in detail. Once uncoiled to a desired length, the fiber optic cable 106 may be strain relieved to the storage tray 104 to relieve the internal remaining length of cable from pulling forces applied to the external portion of the cable. The cable may be partially strain relieved using the transition boot 124 as described above. The cable may also be strain relieved using a grommet 140 that is secured to a surface of the tray 104, preferably an interior surface. The cable may also be strain relieved using any other method known in the art including, but not limited to, cable ties.

Figure 6:
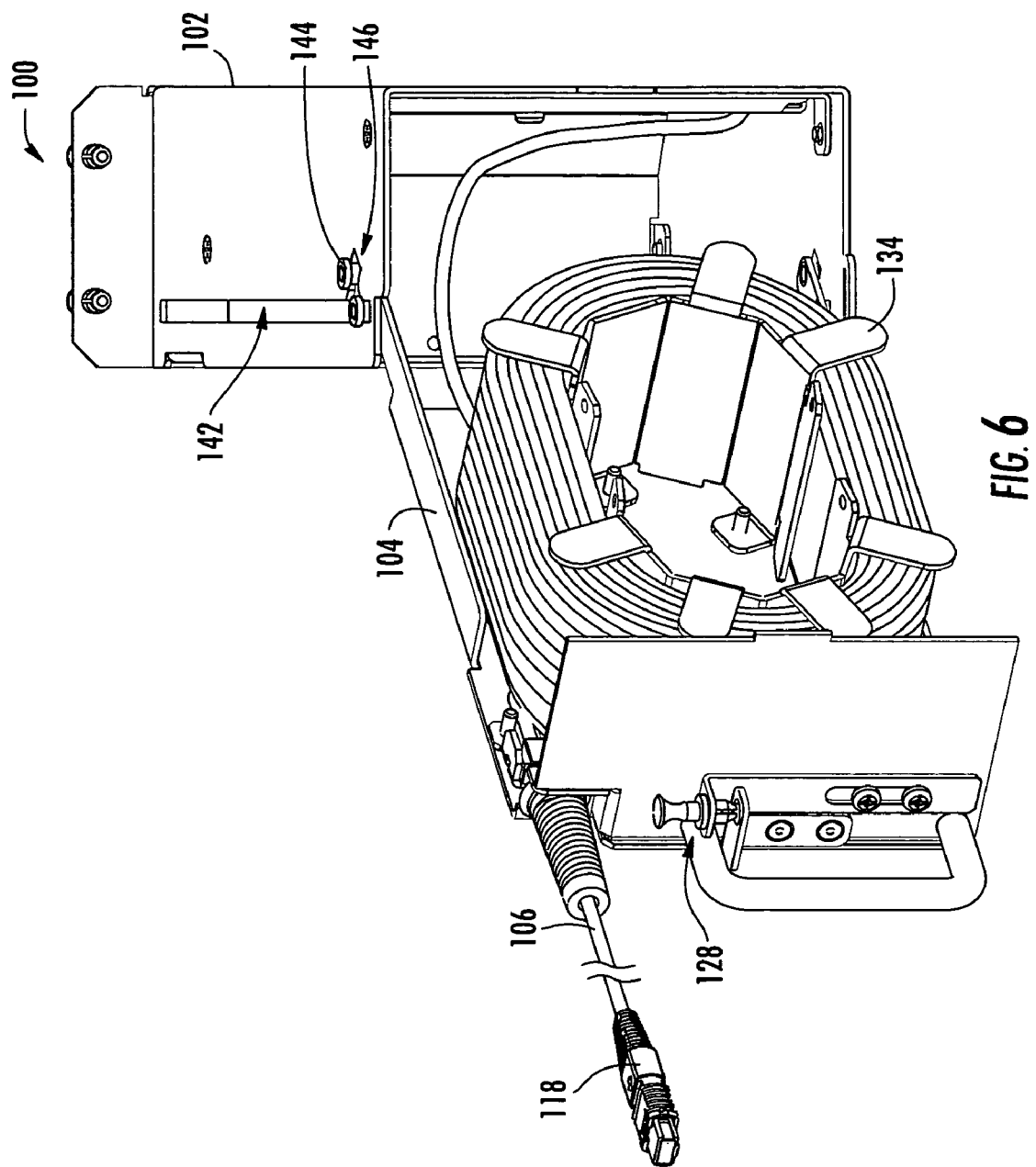
FIG. 6 is a perspective view of the apparatus of FIG. 1 shown with the storage tray in an opened and pivoted position.

Referring to FIG. 6, the apparatus 100 is shown with the storage tray both slid open and pivoted and the locking mechanism 128 released. The housing 102 includes channels or slots 142 positioned along the length of each side of the housing that provide a track for guiding and maintaining rollers 144 or wheels of the storage tray 104. The sliding and pivoting movements of the storage tray 104 are supported by the rollers 144. In addition, by providing two rollers 144 on each side of the storage tray 104, the tray is prevented from twisting before the end of the movement. At the fully extended position, at least one of the rollers 144 of each side of the storage tray 104 may extend into a pivot allowing slot 146 routed at a predetermined angle off of the tracks 142. By allowing the storage tray 104 to pivot at full extension at the end of the sliding movement, the field technician is provided with improved access to the fiber optic cable length once the apparatus 100 has been installed in the field. The ability to pivot aids the technician in coiling and uncoiling the cable length, particularly in applications in which multiple apparatus or modules are mounted in parallel within a single connector housing. The storage tray 104 may pivot up to about 90 degrees relative to the longitudinal axis of the apparatus, more preferably up to about 45 degrees. A predetermined maximum pivot may be provided to prevent the storage tray 104 from contacting an adjacent apparatus. As shown, the storage tray 104 is rotated about 40 degrees relative to the longitudinal axis of the apparatus.

Figure 7:
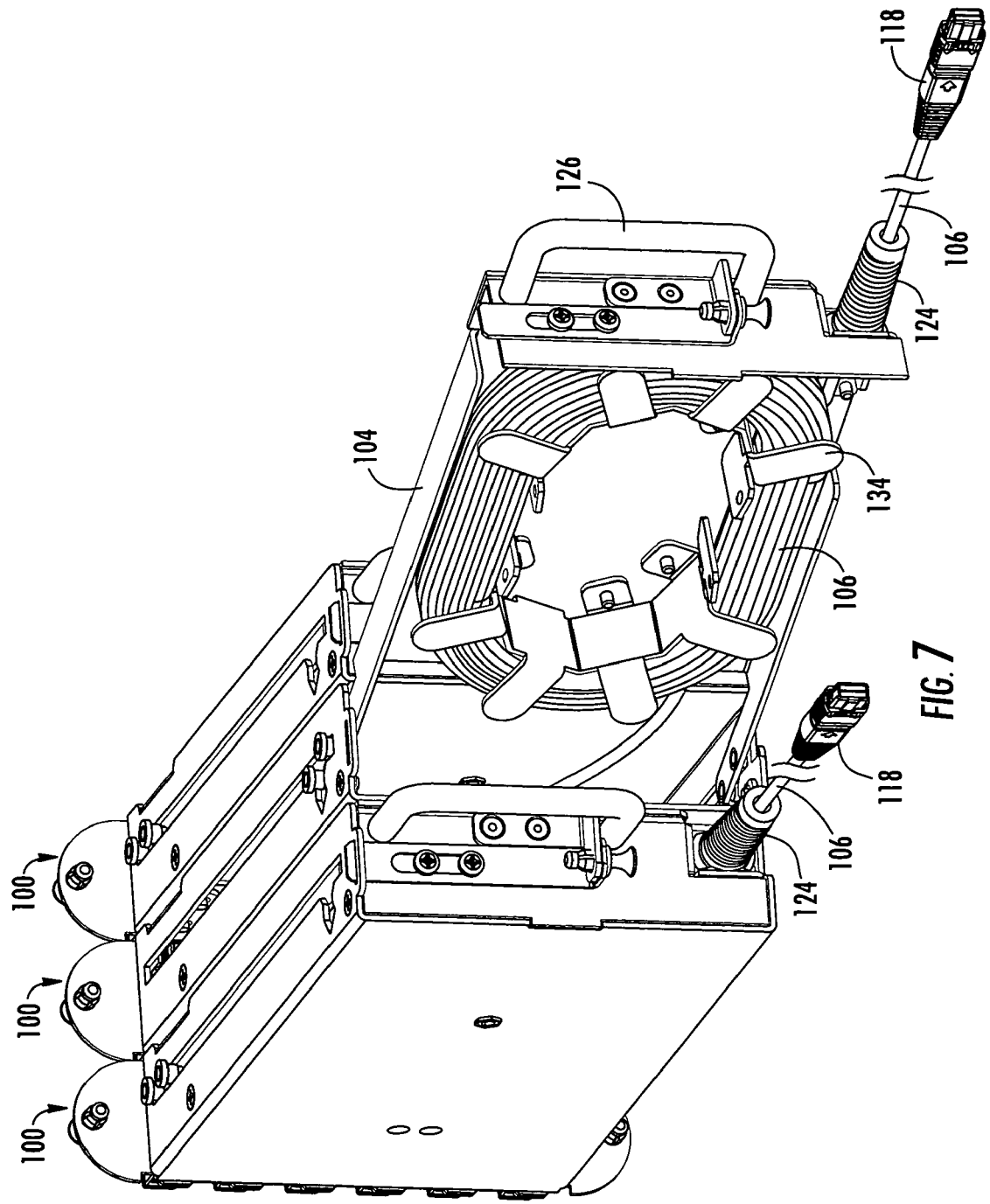
FIG. 7 is a perspective view of multiple pre-connectorized data center network apparatus arranged in parallel.

Referring to FIG. 7, multiple network apparatus 100 are arranged in parallel, illustrating a typical installation environment in a connector housing. Examples of connector housings in which the apparatus may be installed include the Pretium™ Connector Housing family available from Corning Cable Systems of Hickory, N.C. A specific installation environment may include installation within a data center into a PCH-04U connector housing available from Corning Cable Systems. As shown, the storage tray 104 of the middle positioned apparatus 100 is shown in the fully extended position and is also pivoted, thus providing ready access to the fiber optic cable length. As shown, the apparatus 100 does not include the pre-connectorized fiber optic cable.

In the various embodiments described above, the housing, storage tray and other components may be made from various materials such as, but not limited to, plastics, metals, combinations and the like depending upon installation environments. The transition boot is preferably made from a flexible material. Apparatus dimensions may vary depending upon the amount of fiber optic cable storage required and the number of adapters. Preferred embodiments do not require tools for the operation of mounting the network apparatus, accessing the storage tray, or coiling and uncoiling the cable length. The network apparatus described above provide rear side access to the cable length and do not require the apparatus to be removed from its mounting position to access the cable length. Alternative apparatus designs may include sliding only storage trays or pivoting only storage trays.

The pre-connectorized cable may include any type of optical fiber including, but not limited to, bend performance optical fiber, also referred to as "bend insensitive optical fiber" or "bend optimized optical fiber". Bend performance fiber includes microstructured optical fibers comprising a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than 1400 nm, in other embodiments also greater than 1260 nm. The optical fibers provide a mode field at a wavelength of 1310 nm preferably greater than 8.0 microns, more preferably between 8.0 and 10.0 microns. In preferred embodiments, the bend performance fiber is thus single-mode transmission optical fiber.

In some embodiments, the microstructured optical fiber comprises a core region disposed about a longitudinal centerline, and a cladding region surrounding the core region, the cladding region comprising an annular hole-containing region comprised of non-periodically disposed holes, wherein the annular hole-containing region has a maximum radial width of less than 12 microns, the annular hole-containing region has a regional void area percent of less than 30 percent, and the non-periodically disposed holes have a mean diameter of less than 1550 nm. By "non-periodically disposed" or "non-periodic distribution", we mean that when one takes a cross section (such as a cross section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross sections will have different hole patterns, wherein the distributions of holes and sizes of holes do not match. That is, the voids or holes are non-periodic, i.e., they are not periodically disposed within the fiber structure. These holes are stretched (elongated) along the length (i.e. in a direction generally parallel to the longitudinal axis) of the optical fiber, but do not extend the entire length of the entire fiber for typical lengths of transmission fiber.

For a variety of applications, it is desirable for the holes to be formed such that greater than 95% of and preferably all of the holes exhibit a mean hole size in the cladding for the optical fiber which is less than 1550 nm, more preferably less than 775 nm, most preferably less than about 390 nm. Likewise, it is preferable that the maximum diameter of the holes in the fiber be less than 7000 nm, more preferably less than 2000 mm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes.

The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA. The optical fiber disclosed herein may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes. In one set of embodiments, the core region includes doped silica to provide a positive refractive index relative to pure silica, e.g. germania doped silica. The core region is preferably hole-free.

Although the present invention has been illustrated and described herein with reference to preferred embodiments and specific examples thereof, it will be readily apparent to those of ordinary skill in the art that other embodiments and examples can perform similar functions and/or achieve like results. For example, latching, sliding, hinging, strain relieving, furcating and fastening equivalents are within the scope of the present invention. All such equivalent embodiments and examples are within the spirit and scope of the present invention and are intended to be covered by the following claims.

What is claimed is:

1. A pre-connectorized network interconnection apparatus, comprising:
   at least one connector adapter;
   a housing defining at least one opening mounting the at least one connector adapter therein;
   a fiber optic cable storage tray movably attached to the housing movable between an opened position and a closed position for fiber optic cable access, wherein the at least one connector adapter is configured to remain stationary with respect to the housing when moving the storage tray between the open position and the closed position; and
   a predetermined length of pre-connectorized fiber optic cable maintained on the storage tray, wherein a first end of the fiber optic cable terminates in at least one connector routed to the at least one connector adapter within the apparatus and a second end of the fiber optic cable terminates in at least one connector that is routed to a predetermined location within a fiber optic network.

2. The apparatus of claim 1, wherein the housing defines a first internal cavity portion for receiving the predetermined length of fiber optic cable and a second internal cavity portion for maintaining the at least one connector routed to the at least one connector adapter, and wherein the first and second internal cavity portions are substantially separated by a transition lid defining an opening for allowing the fiber optic cable to pass therethrough.

3. The apparatus of claim 1, further comprising a cable transition boot and a cable strain relief feature.

4. The apparatus of claim 1, wherein the housing defines at least one track for receiving at least one roller of the storage tray such that the storage tray slidably engages the housing.

5. The apparatus of claim 1, wherein the storage tray is pivotally attached to the housing.

6. The apparatus of claim 5, wherein the storage tray pivots less than about 45 degrees relative to a longitudinal axis of the apparatus.

7. The apparatus of claim 1, wherein the storage tray is slidably and pivotally attached to the housing.

8. The apparatus of claim 1, wherein the storage tray allows access to the length of fiber optic cable from a rear side of the apparatus without having to remove the apparatus from a mounting structure.

9. The apparatus of claim 1, further comprising a handle secured to the storage tray for pulling out and pushing in the storage tray.

10. The apparatus of claim 1, further comprising a self-locking mechanism to lock the storage tray in place.

11. The apparatus of claim 1, wherein the apparatus is deployed in a data center of a fiber optic network to provide a link between fiber optic connection points.

12. The apparatus of claim 1, wherein the length of fiber optic cable is manually coiled and uncoiled as needed to provide sufficient cable length for routing the second end of the fiber optic cable to the predetermined location.

13. The apparatus of claim 1, wherein the first end of the fiber optic cable terminates in at least one single fiber connector and the second end terminates in at least one multi-fiber connector.

14. The apparatus of claim 1, wherein the apparatus can be configured to be either left-opened or right opened.

15. The apparatus of claim 1, wherein fiber optic cable access does not require the use of tools.

16. The apparatus of claim 1, wherein the fiber optic cable includes bend performance optical fiber.

17. A fiber optic network interconnection apparatus, comprising:
at least one connector adapter;
a housing defining at least one opening positioned about a front end of the housing for receiving the at least one adapter therein;
a fiber optic cable storage tray slidably and pivotally attached to the housing, wherein the at least one connector adapter is configured to remain stationary with respect to the housing when sliding and pivoting the storage tray with respect to the housing; and
a predetermined length of pre-connectorized fiber optic cable maintained on the storage tray and terminating at a first end in at least one single fiber connector routed to a rear side of the at least one adapter and terminating at a second end in a multi-fiber connector; and
wherein the predetermined length of pre-connectorized fiber optic cable allows a technician to uncoil or coil the cable to provide a sufficient length of cable for routing the multi-fiber connector to a predetermined location within the network.

18. The apparatus of claim 17, wherein the housing defines a first cavity portion for receiving the predetermined length of fiber optic cable and a second cavity portion for maintaining the at least one single fiber connector routed to the at least one adapter, and wherein the first and second cavity portions are substantially separated by a transition lid defining an opening for allowing the fiber optic cable to pass therethrough.

19. The apparatus of claim 17, wherein the storage tray comprises a handle, a locking mechanism, a slot for receiving a flexible cable transition boot and a cable strain relief feature.

20. A fiber optic data center network apparatus, comprising:
a housing including at least one connector adapter mounted therein and defining a first portion for maintaining at least one single fiber connector and a second portion for receiving a length of fiber optic cable, wherein the first and second portions are at least partially separated by a transition lid;
a cable storage tray movably attached to the housing movable between an opened and closed position to provide access to a length of fiber optic cable from a rear side of the apparatus without having to dismount the apparatus from a mounting structure, wherein the transition lid is configured to remain stationary with respect to the housing when moving the storage tray between the opened position and the closed position;
a pre-connectorized fiber optic cable coiled around at least one cable maintaining feature of the storage tray and terminating at a first end in the at least one single fiber connector and terminating at a second end in at least one multi-fiber connector; and
wherein fiber optic cable length is coiled or uncoiled as needed to provide sufficient length of the fiber optic cable to route the at least one multi-fiber connector to a desired location.

21. The apparatus of claim 2, wherein the transition lid is configured to remain stationary with respect to the housing when moving the storage tray between the open position and the closed position.

22. The apparatus of claim 18, wherein the transition lid is configured to remain stationary with respect to the housing when sliding and pivoting the storage tray with respect to the housing.

23. A pre-connectorized network interconnection apparatus, comprising:
at least one connector adapter;
a housing defining at least one opening mounting the at least one connector adapter therein;
a fiber optic cable storage tray movably attached to the housing movable between an opened position and a closed position for fiber optic cable access;
a predetermined length of pre-connectorized fiber optic cable maintained on the storage tray, wherein a first end of the fiber optic cable terminates in at least one connector routed to the at least one connector adapter within the apparatus and a second end of the fiber optic cable terminates in at least one connector that is routed to a predetermined location within a fiber optic network; and
wherein the housing defines a first internal cavity portion for receiving the predetermined length of fiber optic cable and a second internal cavity portion for maintaining the at least one connector routed to the at least one connector adapter, and wherein the first and second internal cavity portions are substantially separated by a transition lid defining an opening for allowing the fiber optic cable to pass therethrough, wherein the transition lid is configured to remain stationary with respect to the housing when moving the storage tray between the open position and the closed position.

24. The apparatus of claim 23, wherein the fiber optic cable storage tray is slidably and pivotally attached to the housing.

25. The apparatus of claim 23, wherein the housing defines at least one track for receiving at least one roller of the storage tray such that the storage tray slidably engages the housing.

* * * * *